Feb. 19, 1963 D. W. DANIEL ET AL 3,077,877
HONE DRESSING APPARATUS
Filed Dec. 21, 1959 2 Sheets-Sheet 1
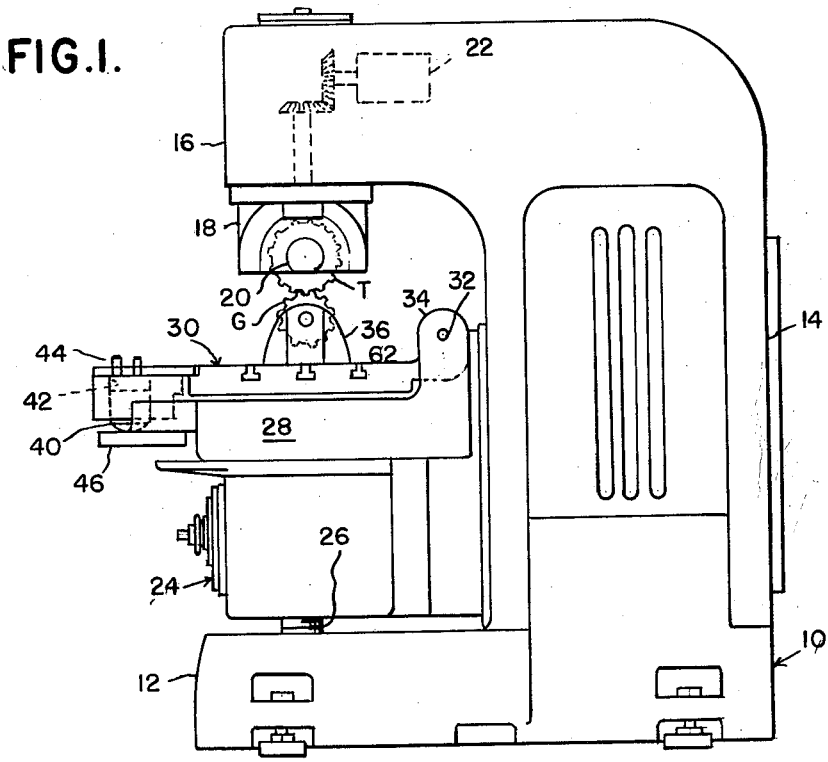
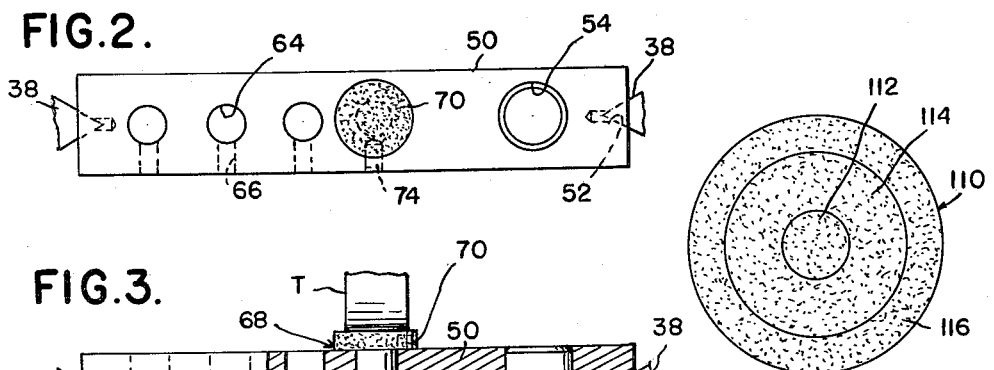
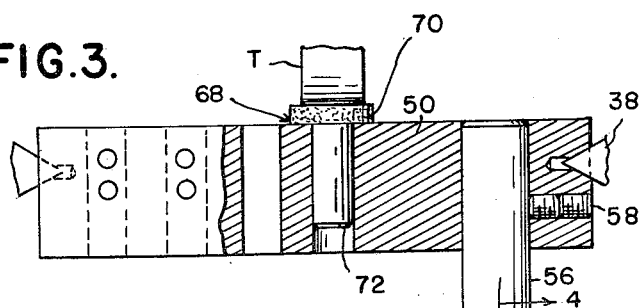
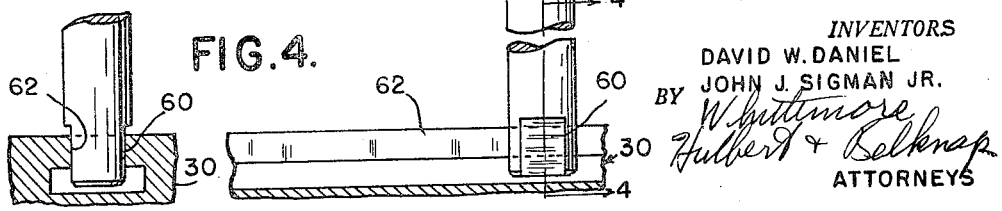
INVENTORS
DAVID W. DANIEL
JOHN J. SIGMAN JR.
BY
ATTORNEYS Feb. 19, 1963    D. W. DANIEL ET AL    3,077,877
HONE DRESSING APPARATUS
Filed Dec. 21, 1959    2 Sheets-Sheet 2
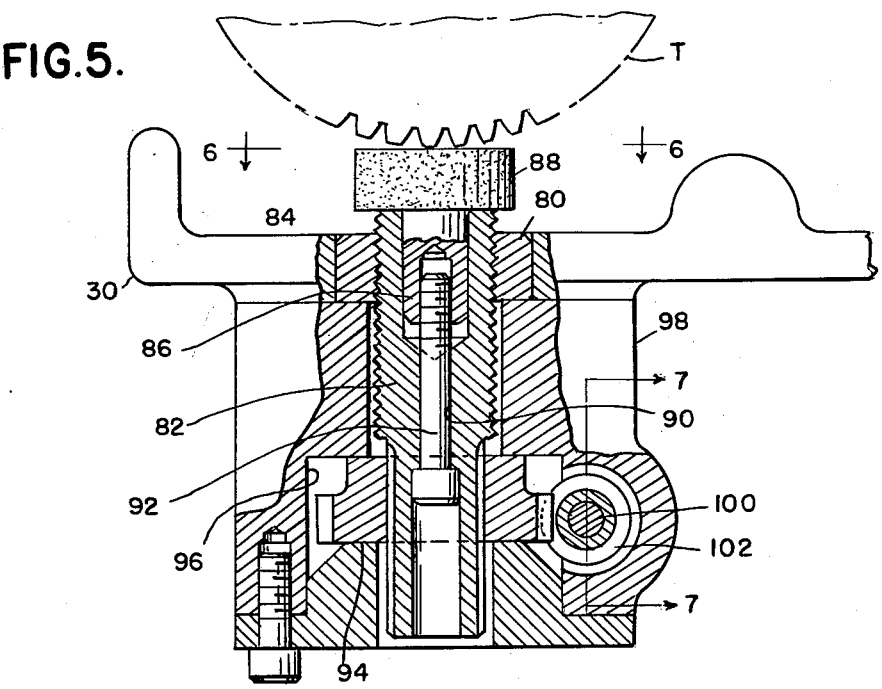
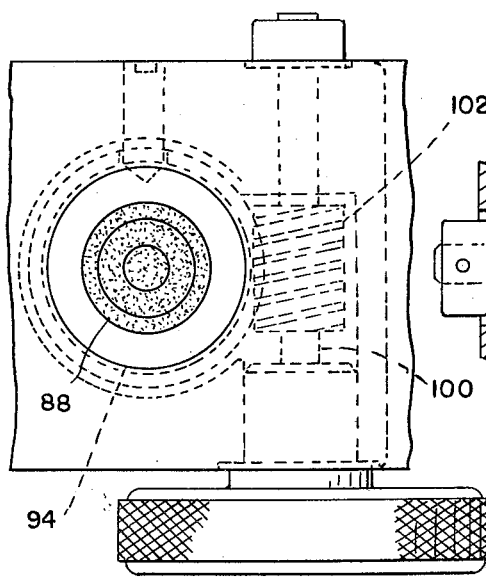
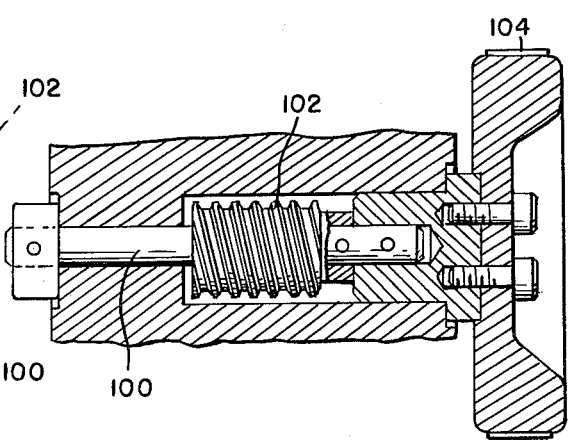
INVENTORS
DAVID W. DANIEL
JOHN J. SIGMAN JR.
BY Whittemore,
Hulbert & Belknap
ATTORNEYS 3,077,877
HONE DRESSING APPARATUS
David W. Daniel and John J. Sigman, Jr., Detroit, Mich., assignors to National Broach & Machine Company, Detroit, Mich., a corporation of Michigan
Filed Dec. 21, 1959, Ser. No. 860,773
18 Claims. (Cl. 125—11)

The present invention relates to hone dressing apparatus, and more particularly to apparatus for dressing the outside diameter of gear-like gear honing tools.

A gear honing tool is formed in the shape of a gear having at least its toothed portions formed of relatively hard but slightly yieldable highly resilient resin or plastic material having separate abrasive grits or grains embedded therein and exposed at the surface thereof. A tool of these type is used to finish hardened steel gears, to remove nicks and imperfections, to improve the surface finish of the teeth of the gear, and to improve the form of the gear teeth. While a honing tool of this type is quite durable and may be used to hone the teeth of many thousands of work gears, nevertheless the honing operation is essentially an abrading operation so that there is inherently some abrasive wear of the gear honing tool. This wear of course takes place on the sides or flanks of the teeth of the gear-like hone so that these teeth become thinner. The gear honing operation is normally carried out with the gear and gear-like honing tool in tight mesh, so that as the thickness of the teeth of the hone becomes reduced by wear, the gear and hone mesh at a reduced center distance.

Eventually, this reduction in center distance, occurring throughout the useful life of the hone, produces interference between the crests of the teeth of the hone and the roots of the teeth of the work gear. In many cases it is desirable to avoid this interference and this is most easily accomplished by removing material from the crests of the teeth of the gear-like hone. However, the material of the hone is extremely difficult to machine, particularly since the material is to be removed from a multiplicity of circumferentially spaced teeth.

With the foregoing general discussion of the problem in mind, it is an object of the present invention to provide apparatus for dressing the outside diameter or periphery of a gear-like hone in a manner to remove material from the crests of the teeth.

More specifically, it is an object of the present invention to provide apparatus of the character described including an abrasive body having a substantially flat surface and means for pressing the flat surface of the body against the outer diameter of a gear-like hone, together with means for driving the hone in rotation to effect a reduction in diameter by removal of material from the crests of its teeth.

It is a further object of the present invention to provide a gear honing apparatus including a spindle for supporting and driving a gear-like honing tool in rotation, together with means for mounting an abrasive body adjacent a hone carried by the spindle, and means for moving the abrasive body into dressing engagement with the periphery of the hone.

More specifically, it is an object of the present invention to provide a gear honing machine including a frame, a hone support on said frame including a spindle, means for driving the spindle in rotation, a work support on said frame including a pair of relatively moveable rotatable centers for supporting the shaft or arbor of a work gear therebetween, means for effecting relative approach and separation between said centers, a bar having its ends formed for engagement with said centers, an abrasive body on said bar, and means on said bar engageable with the portion of said machine which carries said centers for preventing rotation of said bar.

It is a further object of the present invention to provide gear hone dressing apparatus comprising means for supporting a gear-like gear honing tool, an abrasive dressing tool including a substantially flat surfaced body, means for driving the gear honing tool in rotation, and means for moving the substantially flat surface of the abrasive body against the periphery of the gear hone.

It is a further object of the present invention to provide gear hone dressing apparatus as described in the preceding paragraph which includes means for effecting angular or rotational adjustment of the abrasive body.

It is a further object of the present invention to provide gear hone dressing apparatus as described in the preceding two paragraphs which includes thread means for simultaneously effecting movement of the abrasive body toward and into engagement with a gear hone and for effecting rotational adjustment thereof.

Other objects and features of the invention will become apparent as the description proceeds, especially when taken in conjunction with the accompanying drawings, illustrating preferred embodiments of the invention, wherein:

FIGURE 1 is a side elevation of a gear honing machine adapted to incorporate the gear hone dressing apparatus of the present invention.

FIGURE 2 is an enlarged plan view of a hone dresser for use in the machine illustrated in FIGURE 1.

FIGURE 3 is an enlarged fragmentary view with parts in section showing the assembly of the hone dressing tool in the machine.

FIGURE 4 is a fragmentary sectional view on the line 4—4, FIGURE 3.

FIGURE 5 is an enlarged elevational view partly in section showing the second embodiment of a gear hone dressing apparatus.

FIGURE 6 is a fragmentary plan view of the gear hone dressing apparatus taken on the line 6—6, FIGURE 5.

FIGURE 7 is a fragmentary sectional view taken on the line 7—7, FIGURE 5.

FIGURE 8 is an enlarged plan view of the hone dressing element.

Referring now to FIGURE 1 there is shown a gear honing machine comprising a frame 10 including a base 12, a column 14, and an overhanging arm 16 which carries a tool support or head 18 mounted for angular adjustment about a vertical axis. The head includes a spindle 20 adapted to carry an abrasive gear-like gear honing tool T. Drive means are provided for rotating the spindle 20 including a motor 22.

Vertically movable on ways provided at the front of the column 14 is a knee 24, a suitable feed screw and nut being provided to effect vertical adjustment of the knee. A portion of the feed screw is seen at 26. Mounted on the knee 24 is a table 28, suitable ways (not shown) being provided so that the table may be reciprocated horizontally in a direction perpendicular to the plane of the figure. A work support platform 30 is provided which is pivoted as indicated at 32 to upstanding post structure 34 provided on the table 28. Mounted on the platform 30 are a pair of stocks one of which is indicated at 36, the stocks including mounting means for centers 38, portions of which are seen in FIGURES 2 and 3. One of the centers is of course retractable to provide for engagement and release of a work gear shaft or arbor therebetween. Motor means (not shown) are provided for effecting horizontal traverse of the table 28 so that a work gear G mounted between the centers 38 may be meshed with the tool T and driven thereby in rotation. The gear and tool may of course be meshed at crossed axes by effecting angular adjustment of the head 18 about its vertical adjustment axis.

Means are provided for predetermining and controlling the pressure between the teeth of the work gear G and the honing tool T. This means comprises a piston 40 movable in a cylinder 42 to which hydraulic fluid is admitted at a controlled pressure through a conduit 44. The piston engages a fixed ledge 46 carried by the table 28 and tends to cause the platform 30 to swing upwardly about its pivot axis 32. Since the axis is located in substantially the same horizontal plane as the axis of the centers 38, limited swinging movement of the platform 30 results in substantially vertical movement of the work gear G.

In accordance with the present invention means are provided for reducing the outside diameter of the tool T periodically to prevent interference with the tips of the teeth of the honing tool T with the bottoms of the tooth spaces of the gear G. This means is best illustrated in FIGURES 2–4 and comprises a bar 50 having recesses 52 at its ends for receiving the pointed ends of the centers 38. The bar is provided with a through opening 54 which receives a rod 56 retained in place by a set screw 58 and having a reduced end portion 60 engageable in a T-slot 62 provided in the platform 30. As best illustrated in FIGURE 3, this prevents rotation of the bar 50.

The bar 50 is also provided with a plurality of smaller openings 64 each of which is intersected by a threaded opening 66. A gear hone dressing tool indicated generally at 68, is provided and comprises a disc 70 having a substantially flat upper surface engageable with the periphery of the gear hone T, and provided with a downwardly extending cylindrical stem 72 adapted to be received in one of the openings 64 and to be engaged by a set screw 74 received in the threaded opening 66.

The cylindrical body 70 is preferably a diamond dresser having diamonds of a grit size between 20 and 80 retained therein. The body 70 is preferably formed of a matrix of a mixture of tungsten carbide base powder and a metal alloy such for example as silver solder.

As best seen in FIGURE 3, it will be observed that the hone dresser body 70 is adapted to engage across the full width of the honing tool T so that no feed or traverse transversely of the honing tool is required. Moreover, the pressure acting between the upper surface of the dresser body 70 and the ends of the teeth or the interrupted peripheral surface of the hone may be controlled by the same means as controls the pressure between a gear and a gear honing tool; namely, the pressure supplied to the cylinder 42.

Referring now to FIGURES 5–8 there is illustrated a second embodiment of the present invention. In this case the platform 30 which is movable bodily substantially toward and away from the gear honing tool T, is provided with a threaded nut or nut member 80 which receives an elongated screw 82. The screw or bolt member 82 is provided with a recess 84 at its upper end which extends axially thereof and which is adapted to receive the shank 86 of the diamond dresser tool including the cylindrical abrasive body 88. The screw 82 is provided with an elongated axially extending opening 90 which receives a bolt 92 the upper end of which is engaged in a threaded opening in the lower end of the shank 86. Splined to the lower end of the screw 82 is a worm gear 94 which is mounted for rotation but held against axial displacement in a recess 96 formed in a housing 98. The housing mounts a shaft 100 carrying a worm gear 102 which meshes with the worm gear 94. At its outer end the shaft 100 carries a knurled hand wheel 104 so that the hone dressing body 88 may be given an accurate adjustment relative to the gear hone T. Since the forward feeding movement of the dresser body is through a worm and worm gear, this feed is irreversible and is adapted to hold the abrasive dresser body 88 in adjusted position.

The threaded connection between the screw 82 and the nut 80 may if desired be of extremely fine pitch so that a very considerable rotation of the abrasive body 88 is required to effect substantial axial advance.

The foregoing constitutes a very important feature of the present invention since it provides automatic angular or rotational adjustment of the dresser body accomplished as a result of its axial advance. This serves to maintain the upper surface of the dresser body 88 substantially flat at all times. In the hone dressing operation the motor will be energized to drive the honing tool T at substantial speed while the operator rotates the hand wheel 104 to elevate the hone dresser 88 into engagement with the outside diameter of the honing tool. Inasmuch as the abrasive body 88 is a diamond dresser it will be effective to cut or remove material from the crests of the teeth of the hone at a substantial rate. Accordingly, during reduction in outside diameter of the honing tool the operator will continue to rotate the hand wheel 104 to cause the hone dresser to move upwardly to remain in pressure contact with the crests of the teeth of the hone as material is removed therefrom. In some cases the gear honing machine is provided with means effective to lock the platform 30 against movement about its pivot axis 32. In this case the force exerted between the hone dresser 88 and the crests of the teeth of the honing tool T is determined by the force applied to the hand wheel 104. On the other hand, if the platform 30 is free to move, the force between the upper surface of the dressing tool 88 will be determined by the pressure of fluid admitted to the cylinder 42. In any case, upward movement of the dresser is at all times accompanied by rotational adjustment thereof about its vertical axis so that any tendency for the teeth of the hone to wear a cylindrical convexity in the upper surface of the dresser is avoided.

Although the foregoing arrangement tends to maintain a flat surface at the top of the hone dresser 88, it is preferred to modify the construction to provide a hone dressing tool as illustrated at 110 in FIGURE 8. In this case the hone dressing tool is provided with a center section 112 and at least one annular section 114 surrounding the center section. As illustrated in FIGURE 8, there is provided a third outer annular section 116. It will be understood that so long as the crests of the teeth of the hone occupy a cylindrical surface, and so long as the upper surface of the hone dresser remains flat, contact between the crests of the teeth of the hone and the flat surface of the hone dresser theoretically occupies a single line. In practice of course, due to many factors including deformation of material, this contact spreads out to occupy an elongated relatively narrow zone. As the dresser body is rotated about its axis this zone remains fixed in space and accordingly occupies a different transverse position across the upper flat surface of the hone dresser. However, there is a zone at the center of the upper surface of the hone dresser which always remains in contacting relation with the crests of the teeth of the hone. This has the result of tending to produce an upwardly concave surface on the hone dresser, since portions at the center thereof are always in position to contact the crests of the teeth of the hone, whereas portions adjacent the outer edge thereof are only in position to engage crests of the hone teeth during a small part of the possible 360 degrees angular adjustment of the hone dresser.

This tendency to produce a concave upper surface is successfully counteracted by providing a hone dressing material in the center section 112 of the hone dresser which is more resistant to abrasion than is the outer portion thereof. This is accomplished most conveniently by using coarser diamond grit at the center portion of the dresser. Excellent results have been obtained when the center of the dresser occupies a circular area having a diameter of ⅜ of an inch in which the relatively coarse diamond grit, such for example 20–40 grit, is employed. The intermediate annular zone 114, in the specific example, has a radial width of ¼ of an inch and includes an intermediate diamond grit as for example 40–60 grit. The outer annular zone 116 includes relatively fine diamond particles as for example 60–80 grit. With this arrangement and with the rotation of the dresser resulting from the screw adjustment thereof axially, the upper surface of the hone dresser remains substantially flat throughout its useful life. It will of course be appreciated that the specific nature of the matrix and the specific particle size of the diamond grit may be varied as required by the specific character of the gear honing tool.

In both embodiments of the invention however, it will be observed that the hone is dressed in a manner to reduce its outside diameter by contacting its periphery with an abrasive dressing tool adapted to extend completely across the edge of the honing tool. Moreover, the nature of the engagement between the surface of the dresser and the crests of the teeth of the hone is particularly desirable since it does not provide the intermittent impact type engagement which would result from feeding a pointed trimming tool transversely across the hone from side to side thereof.

The drawings and the foregoing specification constitute a description of the improved hone dressing apparatus in such full, clear, concise and exact terms as to enable any person skilled in the art to practice the invention, the scope of which is indicated by the appended claims.

What we claim as our invention is:

1. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of abrasive material having a substantially flat surface extending across the edges of said honing tool and being effective to remove material from the periphery of said honing tool at the crests of the teeth thereof, means for driving said spindle, and means for pressing the flat surface of said hone dressing tool against the periphery of said honing tool during rotation of said spindle.

2. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of diamond abrasive material having a substantially flat surface extending across the edges of said honing tool and being effective to remove material from the periphery of said honing tool at the crests of the teeth thereof, means for driving said spindle, and means for pressing the flat surface of said hone dressing tool against the periphery of said honing tool during rotation of said spindle.

3. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of abrasive material having a substantially flat surface extending across the edges of said honing tool and being effective to remove material from the periphery of said honing tool at the crests of the teeth thereof, means for driving said spindle, means for adjusting said hone dressing tool radially of the honing tool on said spindle, and means for adjusting said hone dressing tool angularly about its path of radial adjustment.

4. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of abrasive material having a substantially flat surface extending across the edges of said honing tool and being effective to remove material from the periphery of said honing tool at the crests of the teeth thereof, means for driving said spindle, and thread means for feeding said hone dressing tool radially of the honing tool on said spindle and for effecting coresponding angular adjustment thereof about the axis of radial adjustment.

5. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of abrasive material having a substantially flat surface extending across the edges of said honing tool and being effective to remove material from the periphery of said honing tool at the crests of the teeth thereof, means for driving said spindle, means for adjusting said hone dressing tool radially of the honing tool on said spindle, and means for adjusting said hone dressing tool angularly about its path of radial adjustment, said hone dressing tool having an intermediate zone on the surface thereof located on its axis of angular adjustment which is relatively more resistant to abrasion than a surrounding zone thereof.

6. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of abrasive material having a substantially flat surface extending across the edges of said honing tool and being effective to remove material from the periphery of said honing tool at the crests of the teeth thereof, means for driving said spindle, means for adjusting said hone dressing tool radially of the honing tool on said spindle, and means for adjusting said hone dressing tool angularly about its path of radial adjustment, said hone dressing tool having an intermediate zone on the surface thereof located on its axis of angular adjustment which contains relatively coarser grit than a surrounding zone thereof, and means for pressing the flat surface of said hone dressing tool against the periphery of said honing tool during rotation of said spindle.

7. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a hone dressing tool on said frame, said hone dressing tool comprising a body of abrasive material having a substantially flat surface extending across the edges of said honing tool and being effective to remove material from the periphery of said honing tool at the crests of the teeth thereof, means for driving said spindle, thread means for feeding said hone dressing tool radially of the honing tool on said spindle and for effecting corresponding angular adjustment thereof about the axis of radial adjustment, said thread means comprising a stationary nut carried by said frame having its axis radial with respect to said spindle, a threaded rod in said nut to which said hone dressing tool is secured, a worm gear splined to said rod and mounted in said frame in a fixed position for rotation, and an adjusting worm carried by said frame in mesh with said worm gear and effective to rotate said rod, thereby providing relative approach and separation between the surface of said dressing tool and the periphery of the honing tool.

8. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a work support on said frame including relatively movable and rotatable centers for supporting the shaft or arbor of a work gear therebetween, drive means connected to said spindle for driving said spindle and the honing tool thereon in rotation, means on said frame for moving one of said supports toward the other of said supports, a hone dressing tool comprising a bar having ends shaped to be engaged by said centers, a hone dressing element of abrasive material on said bar, said element including a substantially flat surface extending across the edges of said honing tool, and means extending from said bar engageable with the portion of the apparatus carrying said centers to prevent rotation of said bar.

9. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a work support on said frame including relatively movable and rotatable centers for supporting the shaft or arbor of a work gear therebetween, drive means connected to said spindle for driving said spindle and the honing tool thereon in rotation, means on said frame for yieldably urging one of said supports toward the other of said supports, a hone dressing tool comprising a bar having ends shaped to be engaged by said centers, a hone dressing element of abrasive material on said bar, said element including a substantially flat surface extending across the edges of said honing tool, and means extending from said bar engageable with the portion of the apparatus carrying said centers to prevent rotation of said bar.

10. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a work support on said frame including relatively movable and rotatable centers for supporting the shaft or arbor of a work gear therebetween, drive means connected to said spindle for driving said spindle and the honing tool thereon in rotation, means on said frame for moving one of said supports toward the other of said supports, a hone dressing tool comprising a bar having ends shaped to be engaged by said centers, a hone dressing element on said bar, means extending from said bar engageable with the portion of the apparatus carrying said centers to prevent rotation of said bar, said element comprising a flat surfaced abrasive body, and means for adjusting said body angularly on said bar about a central axis thereof radial with respect to said spindle.

11. Gear honing apparatus comprising a frame, a tool support on said frame including a rotary spindle for supporting a gear-like honing tool having a series of teeth thereon conjugate to the teeth of a gear to be honed, the teeth of said honing tool having surface portions formed of hard resilient plastic material having abrasive particles embedded therein, a work support on said frame including relatively movable and rotatable centers for supporting the shaft or arbor of a work gear therebetween, drive means connected to said spindle for driving said spindle and the honing tool thereon in rotation, means on said frame for moving one of said supports toward the other of said supports, a hone dressing tool comprising a bar having ends shaped to be engaged by said centers, a hone dressing element on said bar, means extending from said bar engageable with the portion of the apparatus carrying said centers to prevent rotation of said bar, said element comprising a flat surfaced abrasive body, and means for adjusting said body angularly on said bar about a central axis thereof radial with respect to said spindle, said body having a central portion relatively more resistant to abrasion than the outer portion thereof.

12. A dressing apparatus comprising a frame, a support on said frame including a pair of relatively movable centers, means for effecting relative approach and separation between said centers, an elongated bar having its ends formed for engagement with said centers, a plurality of transversely extending openings in said bar, a dressing element having a flat surfaced abrasive body provided with a stem, means for mounting said stem in one of the openings in said bar, said dressing element having its principal axis substantially perpendicular to the longitudinal axis of said bar, and a rod on said frame engageable with said bar for preventing rotation of said bar.

13. A dressing apparatus comprising a frame, an element of abrasive material mounted on said frame, said element having a substantially flat abrading surface engageable with the periphery of a gear-like tool, and thread means provided between said element and said frame for simultaneously effecting an axial feed and corresponding angular adjustment of said element with respect to the tool, said thread means comprising a stationary nut carried by said frame, a threaded rod in said nut to which said element is secured, a worm gear carried by said rod and mounted in said frame for rotation only, and a manually operable adjusting worm carried by said frame in mesh with said worm gear and effective to rotate said rod and adjust the position of said element with respect to the tool.

14. A dressing apparatus comprising a frame, a disc of abrasive material mounted on said frame, said disc having a flat abrading surface and a central circular zone, a plurality of annular zones concentric with and surrounding said central zone, said central and annular zones being relatively more resistant to abrasion radially inwardly from the periphery to the center, and thread means provided between said disc and said frame for effecting a feed adjustment of said disc, said thread means comprising a stationary nut carried by said frame, a threaded rod in said nut to which said disc is secured, a worm gear carried by said rod and mounted in said frame for rotation only, and a manually operable adjusting worm carried by said frame in mesh with said worm gear and effective to rotate said rod and adjust the position of said disc.

15. A hone dressing apparatus defined in claim 14 wherein the central circular zone of the disc employs abrasive diamond particles of grit size 20–40 and the adjacent annular zone employs abrasive diamond particles of grit size 40–60.

16. A dressing apparatus comprising a frame, a threaded nut member, a threaded bolt member in threaded engagement with said nut member, an element of abrasive material, said element having a substantially flat abrading surface adapted to engage the periphery of a gear-like tool, means fixedly mounting one of said members in said frame, means connecting said element to the other of said members with the flat abrading surface of said element perpendicular to the axis of said other member, and means for rotating said other member with respect to said one member to simultaneously provide an axial feed and corresponding angular adjustment of the aforesaid flat abrading surface of said element toward the periphery of the tool.

17. A dressing apparatus defined in claim 16 wherein said element is carried by said bolt member.

18. A dressing apparatus defined in claim 17 wherein said last-mentioned means comprises a worm gear mounted on said one member in said frame for rotation only and an adjusting worm carried by said frame in mesh with said worm gear.

References Cited in the file of this patent

UNITED STATES PATENTS

| | | |
|---|---|---|
| Re. 21,165 | Van Der Pyl | July 25, 1939 |
| 238,461 | Trammel | Mar. 1, 1881 |
| 440,682 | Wood | Nov. 18, 1890 |
| 451,327 | Klab | Apr. 28, 1891 |
| 1,057,227 | Sheehan | Oct. 7, 1913 |
| 1,180,260 | Grice | Apr. 18, 1916 |
| 2,309,016 | Ryan | Jan. 19, 1943 |
| 2,647,346 | Conradson | Aug. 4, 1953 |
| 2,770,925 | Wallace | Nov. 20, 1956 |
| 2,826,189 | Kirzmer | Mar. 11, 1958 |
| 2,848,848 | Hutchins | Aug. 26, 1958 |
| 2,862,492 | Bruce et al. | Dec. 2, 1958 |
| 2,914,058 | Sommer | Nov. 24, 1959 |

FOREIGN PATENTS

| | | |
|---|---|---|
| 153,489 | Australia | Oct. 1, 1953 |
| 749,141 | Great Britain | May 16, 1956 |